(12) United States Patent
Kim et al.

(10) Patent No.: US 8,687,131 B2
(45) Date of Patent: Apr. 1, 2014

(54) CONTROL DEVICE AND METHOD FOR CONTROL OF BROADCAST RECEIVER

(75) Inventors: Joo-youn Kim, Seoul (KR); Yong-hwan Kwon, Seongnam-si (KR); Jung-a Kim, Suwon-si (KR); Bum-jin Lee, Goyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/241,360

(22) Filed: Sep. 23, 2011

(65) Prior Publication Data

US 2012/0169932 A1 Jul. 5, 2012

(30) Foreign Application Priority Data

Dec. 31, 2010 (KR) .................. 10-2010-0140240

(51) Int. Cl.
*H04N 5/44* (2011.01)
(52) U.S. Cl.
USPC ............ 348/734; 348/563; 348/564; 348/565
(58) Field of Classification Search
USPC ........................................................ 348/734
See application file for complete search history.

(56) References Cited

U.S. PATENT DOCUMENTS

| 6,151,490 A | 11/2000 | Schultheiss |
| 2007/0037522 A1 | 2/2007 | Liu et al. |
| 2009/0185081 A1* | 7/2009 | Ueno et al. ................ 348/734 |
| 2010/0008673 A1* | 1/2010 | Nakamura ................ 398/106 |
| 2010/0066920 A1* | 3/2010 | Kwak ........................ 348/734 |

FOREIGN PATENT DOCUMENTS

WO 2008/048255 A1 4/2008

OTHER PUBLICATIONS

Communication, dated Mar. 28, 2012, issued by the European Patent Office in corresponding European Application No. 11184509.5.

* cited by examiner

*Primary Examiner* — Jefferey Harold
*Assistant Examiner* — Omer Khalid
(74) *Attorney, Agent, or Firm* — Sughrue Mion, PLLC

(57) ABSTRACT

A control device is provided. The control device includes a first communication interface unit which transmits a control command in a first communication mode which uses a bi-directional wireless communication, a second communication interface unit which transmits a control command in a second communication mode which uses a unidirectional wireless communication, a state determination unit which determines a communication mode of the control device, a user interface unit which displays a user interface window which corresponds to a determined communication mode and receives the control command with respect to a broadcast receiver and a control unit which transmits the received control command according to the determined communication mode.

20 Claims, 6 Drawing Sheets

CONTROL DEVICE AND METHOD FOR CONTROL OF BROADCAST RECEIVER

CROSS-REFERENCE TO RELATED APPLICATION

This application claims priority from Korean Patent Application No. 10-2010-0140240, filed on Dec. 31, 2010, in the Korean Intellectual Property Office, the disclosure of which is incorporated herein by reference in its entirety.

BACKGROUND

1. Field

Apparatuses and methods consistent with exemplary embodiments relate to a control device and a method for controlling of a broadcast receiver, and more particularly, to a control device and a method for controlling a broadcast receiver with the control device by using a unidirectional wireless communication when the broadcast receiver cannot be controlled by a bi-directional wireless communication.

2. Description of the Related Art

A broadcast receiver is a device receiving digital satellite broadcasting. The broadcast receiver converts audio/video signals input from a digital broadcasting or an analog broadcasting transmitted from a broadcast station into a TS (transport stream) signal and displays the TS signal or transmits the TS signal to an external display device. For example, the broadcast receiver may be an IPTV (Internet Protocol Television) including a digital TV and a Video On Demand player and a set-top box.

Such broadcast receiver is usually controlled by a control device such as a remote control, but recently, a technology has developed so that the broadcast receiver can be controlled by a general portable device using wireless-fidelity (Wi-Fi).

In the case of a portable device using Wi-Fi, a sleep mode is used to reduce battery consumption. However, when the portable device is in a sleep mode, a waiting time for using the Wi-Fi is necessary in order to control the broadcast receiver. Accordingly, a device demanding a prompt action by a user (such as a remote controller) may be inconvenient for a user.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a control device and a method of controlling a broadcast receiver with the control device by using a unidirectional wireless communication when the broadcast receiver cannot be controlled by a bi-directional wireless communication.

According to an exemplary embodiment, a control device which controls a broadcast receiver includes a first communication interface unit which transmits a control command in a first communication mode which uses a bi-directional wireless communication, a second communication interface unit which transmits a control command in a second communication mode which uses a unidirectional wireless communication, a state determination unit which determines a communication mode of the control device, a user interface unit which displays a user interface window which corresponds to the determined communication mode and receives a control command with respect to the broadcast receiver, and a control unit which transmits the received control command according to the determined communication mode.

The state determination unit may determine the communication mode of the control device to be a second communication mode if it is impossible for the control device to communicate with the broadcast receiver via the first communication mode and determines the communication mode of the control device to be a first communication mode if it is possible for the control device to communicate with the broadcast receiver via the first communication mode.

The state determination unit may determine that the first communication mode is not in a communication able state if the control device is in a sleep mode or a wake-up mode.

The user interface unit where a user selects the first communication mode or the second communication mode and the state determination unit may determine the communication mode of the selected communication mode to be the communication mode of the control device.

The control device may further include a storing unit which stores at least one user interface window between a first user interface window which corresponds to a first communication mode and a second user interface window which corresponds to a second communication mode, and the second user interface window comprises a selection region in order to receive a mode conversion command into the first communication mode.

The user interface unit may indicate that the control device operates in a first communication mode, if the first communication mode is in a communication able state while the second user interface window is being displayed.

The user interface unit may display a same user interface window as displayed before the control device entered into a sleep mode or a off mode, if the determined control mode is a first communication mode.

The second interface unit may be a low-power communication interface unit which operates at a lower power than a first interface unit.

The first communication mode may become a non-communication able state if the control device entered into a sleep mode.

The bi-directional wireless communication may be at least one among a Wi-Fi, radio frequency (RF), Bluetooth, and Wireless high-definition multimedia interface—consumer electronic control (HDMI-CEC), and the unidirectional wireless communication is an infrared data association.

According to an exemplary embodiment, there is provided a method of controlling a broadcast receiver in a control device comprising determining a communication mode of the control device between a first communication mode which uses a bi-directional wireless communication and a second communication mode which uses a unidirectional wireless communication, displaying a user interface window which corresponds to the determined communication mode, receiving a control command with respect to the broadcast receiver via the displayed user interface window, and transmitting the input control command to the broadcast receiver according to the determined communication mode.

The determining the communication mode may determine a communication mode of the control device to be a second communication mode if it is impossible for the control device to communicate with the broadcast receiver via the first communication mode, and determine a communication mode of the control device to be a first communication mode if it is possible for the control device to communicate with the broadcast receiver via the first communication mode.

The determining the communication mode may determine that the first communication mode is in a non-communication able state if the control device is in a sleep mode or a wake-up mode.

The determining the communication mode may determine a communication mode which is selected by a user as a communication mode of the control device.

The displaying the user interface window may display at least one pre-stored user interface window between a first user interface window which corresponds to a first communication mode and a second user interface window which corresponds to a second communication mode, and comprise a selection area in order to receive a mode conversion command into the first communication mode.

The method for controlling the broadcast receiver further includes indicating that it is possible to operate in a first communication mode if the first communication mode is in a communication able state while the second user interface window is displayed.

The displaying the user interface window may display a user interface window which is equal to a user interface window which is displayed by the control device before entering into one mode between a sleep mode and an off mode, if the determined control mode is a first communication mode.

The second communication mode may use a communication interface which operates at a lower power than a first communication mode.

The method for controlling the broadcast receiver may further include the first communication mode becoming a non-communication able state if the control device enters into a sleep mode.

The bi-directional wireless communication may be at least one among RF, Bluetooth, and Wireless HDMI-CEC, and the unidirectional wireless communication may be an Infrared Data Association.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
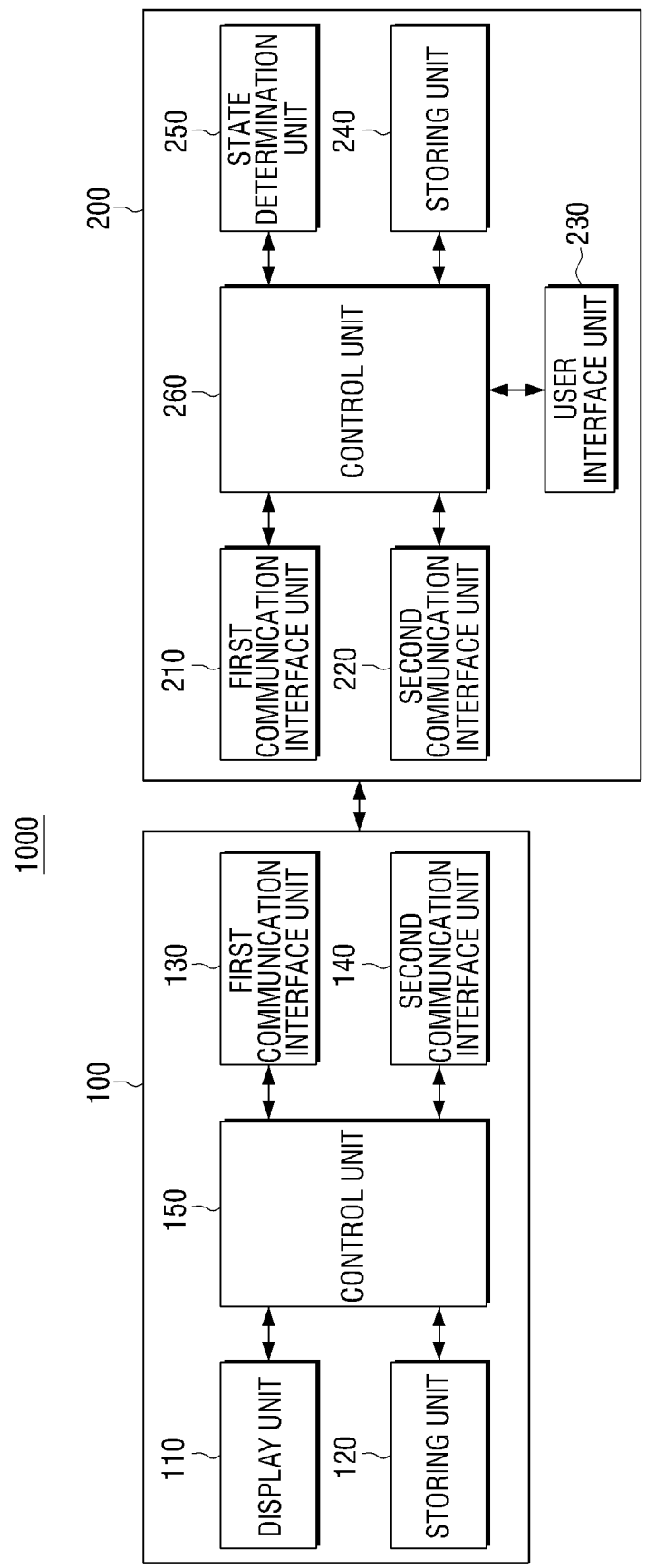
FIG. 1 is a block diagram illustrating a configuration of a home network system according to an exemplary embodiment.

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a block diagram illustrating a configuration of a home network system according to an exemplary embodiment.

Referring to FIG. 1, the home network system 1000 comprises a broadcast receiver 100 and a control device 200. The broadcast receiver 100 is a device providing a user with an image or audio/video information and may comprise a digital TV, a set-top box, a PC, a notebook, and a personal media player (PMP). Specifically, the broadcast receiver 100 may comprise a display unit 110, a storing unit 120, a first communication interface unit 130, a second communication interface unit 140, and a control unit 150.

The display unit 110 may display information provided from the broadcast receiver 100. The display unit 110 may include a device, such as a touch pad, which is capable of receiving and outputting data and may be an image display device such as a liquid crystal display (LCD), a plasma display panel (PDP), and a cathode ray tube (CRT). Accordingly, a user may view on a screen of the device, information received from the broadcast receiver 100.

If the broadcast receiver 100 is a device such as a digital TV, the display unit 110 may be an internal component of the digital TV and if the broadcast receiver 100 is a set-top box, the display unit 110 may be an external device (for example: a TV or a monitor connected to the set-top box).

The storing unit 120 may store content corresponding to a variety of services provided by the broadcast receiver 100. The storing unit 120 may be an internal storing medium and an external storing medium of the broadcast receiver 100 such as a Removable Disk including a USB memory, a storing medium connected to a separate host, and a web server via a network.

The first communication interface unit 130 receives a control command via a bi-directional wireless communication. Specifically, the first communication interface unit 130 may form a link with the first communication interface unit 210 of the control device 200, and transmit a variety of information which the control device 200 requests, or receive the control command of a user from the control device 200. Herein, the bi-directional wireless communication may include all existing communication technologies such as BT (Bluetooth), RF, Wi-Fi, HDMI-CEC, and Wireless HDMI-CEC and all bi-directional wireless communication technologies in the future.

The second communication interface unit 140 receives a control command via a unidirectional wireless communication. Specifically, the second communication unit 140 may receive the control command using the unidirectional wireless communication of the second communication interface unit 220 of the control device 200. Herein, the unidirectional wireless communication may include all existing communication technologies such as Infrared Data Association and all unidirectional wireless technologies in the future.

The control unit 150 controls each configuration in the broadcast receiver 100. Specifically, the control unit 150 may execute a service or operation in response to a control command received from the first communication interface unit 130 or the second communication interface unit 140, thereby providing a service or executing the control command. For example, if the broadcast receiver 100 receives a 'TV channel up' control command from the control device 200, the control unit 150 may execute the control command and change the channel of the TV.

The control unit 150 may transmit information related to a currently provided service to the control device 200. Specifically, the control unit 150, may transmit information which will be helpful for a user, (for example, channel information, current volume, play time, remaining play time, current time, and Electronic Program Guide (EPG)), to the control device 200 in a process of controlling operations of the broadcast receiver 100. Such an operation of transmitting information related to the service may be performed via the first communication interface unit 130.

The control device 200 is a device which may control the broadcast receiver 100 by using the bi-directional wireless communication or the unidirectional wireless communication and may comprise a remote control, a mobile phone, an MP3, a PMP, a navigation, and a digital frame. Specifically, the control device 200 may include the first communication interface unit 210, the second communication interface unit 220, a user interface unit 230, a storing unit 240, a state determination unit 250, and a control unit 260.

The first communication interface unit 210 transmits a control command in a first communication mode using the bi-directional wireless communication. Specifically, the first communication interface unit 210 may form a link for performing the bi-directional wireless communication with the broadcast receiver 100 and transmit a control command received from a user interface unit 230, which will be described later, to the broadcast receiver 100 via the formed link. In addition, the first communication interface unit 210 may receive information which will be useful for a user from the broadcast receiver 100.

The second communication interface unit 220 transmits a control command in a second communication mode using the unidirectional wireless communication. Specifically, if the first communication interface unit 210 is not in a communication able state, the second communication interface unit 220 may transmit a control command received via a user interface unit 230 which will be described later. The control command transmitted via the second communication interface unit 220 is received from the second communication interface unit 140 of the broadcast receiver 100. Herein, since the second communication interface unit 220 uses the unidirectional wireless communication, the second communication interface unit 220 operates at a lower power than the first communication interface unit 210 using the bi-directional wireless communication.

The user interface unit 230 displays a user interface (UI) window for selecting a communication mode. Specifically, the user interface unit 230 provides a plurality of function keys that a user may set or select a variety of functions provided by the broadcast receiver 100 and may display the user interface window for selecting one between the first communication mode or the second communication mode. The user interface unit 230 may comprise a device, such as a touch pad, allowing the selection of the communication mode as well as the input of control commands. Furthermore, the device may include a keypad which can be coupled to a displaying device. Accordingly, a user may select one communication mode. Such an operation of selecting a communication mode may be automatically performed by a state determination unit 250 which will be described later.

The user interface unit 230 may display a user interface window according to the type of communication mode. Specifically, the user interface unit 230 may display the user interface window according to the determined communication mode performed by the state determination unit 250 which will be described later, or selected by a user. For example, if the control device 200 operates in the second communication mode, the user interface unit 230 may display the second user interface window receiving relatively a simple control command only. Herein, the second user interface window may include a selection region for receiving a command to convert a current communication mode into the first communication mode from a user. A specific shape of the second user interface window will be described later with reference to FIGS. 3 and 4.

The user interface unit 230 may indicate that the control device 200 may operate in the first communication mode, if the first communication mode is in a communication able state while the second user interface window is displayed. Specifically, if it is determined that the communication mode is converted from the second communication mode into the first communication mode by the state determination unit 250 which will be described later, the user interface unit 230 may indicate that the broadcast receiver 100 may be controlled using the first communication mode. In addition, the user interface unit 230 may be automatically converted into the first interface window and displayed as such without additional information displaying operations.

If the control device 200 operates in the first communication mode, the user interface unit 230 may display the first user interface window corresponding to the first communication mode. The first user interface window may include a user interface window according to the operation mode of the broadcast receiver 100. For example, according to a feature of the broadcast receiver 100, the user interface window may display a user interface window responding to a variety of modes such as a TV control mode, a VTR control mode, and a search control mode. Namely, if the user watches a TV by using a broadcast receiver, the user interface unit 230 may display the specialized user interface window in controlling a TV. In case where the user performs an internet search by using the broadcast receiver, the user interface unit 230 may display the specialized user interface window for internet searches.

The user interface unit 230 may display a same user interface window as the one displayed in the previous normal mode. Specifically, when the user interface unit 230 displays the first interface window, the user interface unit 230 may display the same user interface window as the one displayed before the display device 200 entered into one mode between a sleep mode and an off mode. For example, if the control device 200 entered into the sleep mode or the off mode while the user interface unit 230 displays the user interface window for controlling a TV screen, the user interface unit 230 may display the user interface window for controlling the TV screen which was displayed in the first communication mode when the control device 200 operates in the first communication mode again.

The user interface unit 230 receives a control command. Specifically, the user interface unit 230 may receive the control command for controlling the broadcast receiver 100 via the user interface window as described above.

The user interface unit 230 may display information useful for a user. Specifically, the user interface unit 230 may display information which is received via the first communication interface unit 210 and will be useful for the user.

The storing unit 240 may store a plurality of user interface windows according to the type of communication mode. The storing unit 240 may store information on the user interface window displayed by the user interface unit 230 before entering into the at least one mode between the sleep mode and the off mode by the control device 200. The storing unit 240 may store information received from the first communication interface unit 210. Such storing unit 240 may be in the form of an internal and/or an external storing medium, for example, a Removable Disk including a USB memory and a Web server via a network. The user interface window according to the communication mode may be provided by the broadcast receiver 100.

The state determination unit 250 may determine a communication mode of the control device 200. Specifically, when the state determination unit 250 determines that the control device 200 is in the first communication mode, the state determination unit 250 may communicate with the broadcast receiver 100 via the bi-directional wireless communication, or, if the control device 200 is in the normal mode. Conversely, when the state determination unit 250 determines that the control device 200 may not communicate with the broadcast receiver 100 via the bi-directional wireless communication, or, if the control device 200 is in the off-mode, the sleep-mode, and the wake-up mode, the state determination unit 250 determines that the control device 200 is in the second communication mode.

Herein, the off-mode is a state where a power of the control device 200 is off, the sleep-mode is a state where the bi-directional wireless communication is stopped in order to reduce a battery consumption, the wake-up mode is a process of re-operating the stopped bi-directional wireless communication, and a normal mode is a state where Wi-Fi between the control device 200 and the broadcast receiver 100 is connected. The normal mode may include a TV mode for controlling a TV, such as the one illustrated in FIG. 4, a VTR mode for controlling a VTR, such as the one illustrated in FIG. 5, and a search mode for an internet search.

The state determination unit 250 may determine a communication mode of the control device 200 according to a selected communication mode by a user via the user interface unit 230. Specifically, although the control device 200 may communicate in the first communication mode, the state determination unit 250 may determine a communication mode of the control device 200 as the second communication mode if the user wants the control device 200 to operate in the second communication mode.

The control unit 260 controls each configuration of the control device 200. Specifically, the control unit 260 may determine an operation mode of the control device 200 via the state determination unit 250 and control the user interface unit 230 so that the user interface window may be displayed according to the determined operation mode.

If the control device unit 260 receives a request for changing a communication mode from a user via the user interface unit 230, the control unit 260 may control the user interface unit 230 so that the user interface window may be displayed according to the requested communication mode.

In addition, if the control unit 260 receives a control command of the broadcast receiver 100 from a user, the control unit 260 may transmit the control command according to the current communication mode. Specifically, when the control device 200 is in the first communication mode, the control unit 260 may control the first communication interface unit 210 so that the control command input via the bi-directional wireless communication may be transmitted. In addition, when the control device 200 is in the second communication mode, the control unit 260 may control the second communication interface unit 220 so that the control command input via the unidirectional wireless communication may be transmitted.

In case where the control device 200 has not been operated for a long time, or, in case where the control device 200 is in the sleep mode, the control unit 260 may control the first communication interface unit 210 so that the first communication mode may not be in a communication able state.

In case where the control unit 260 receives information from the broadcast receiver 100, the control unit 260 may control the user interface unit 230 so that the received information may be displayed with the user interface window corresponding to the current operation mode. Specifically, the broadcast receiver 100 may transmit information (for example: channel information, current volume, playing time, left playing time, current time, and Electronic Program Guide) which will be useful for a user. Thus, the control unit 260 may control the user interface unit 230 so that the information may be displayed on the user interface window according to the current operation mode. The received information related to the services may be displayed continuously, displayed according to a predetermined period, or displayed according to the user's control.

Accordingly, the control device 200 according to an exemplary embodiment may control the broadcast receiver 100 by using the unidirectional wireless communication even when bi-directional wireless communication is impossible, thereby enhancing a user convenience. In addition, since the control device 200 displays the optimized user interface window according to a communication mode, the user may control of the broadcast receiver more conveniently.

In the description of FIG. 1, the control device 200 is described to control only one broadcast receiver 100, but the control device 200 may control a plurality of broadcast receivers, which will be described in the following description with reference to FIG. 2.

Figure 2:
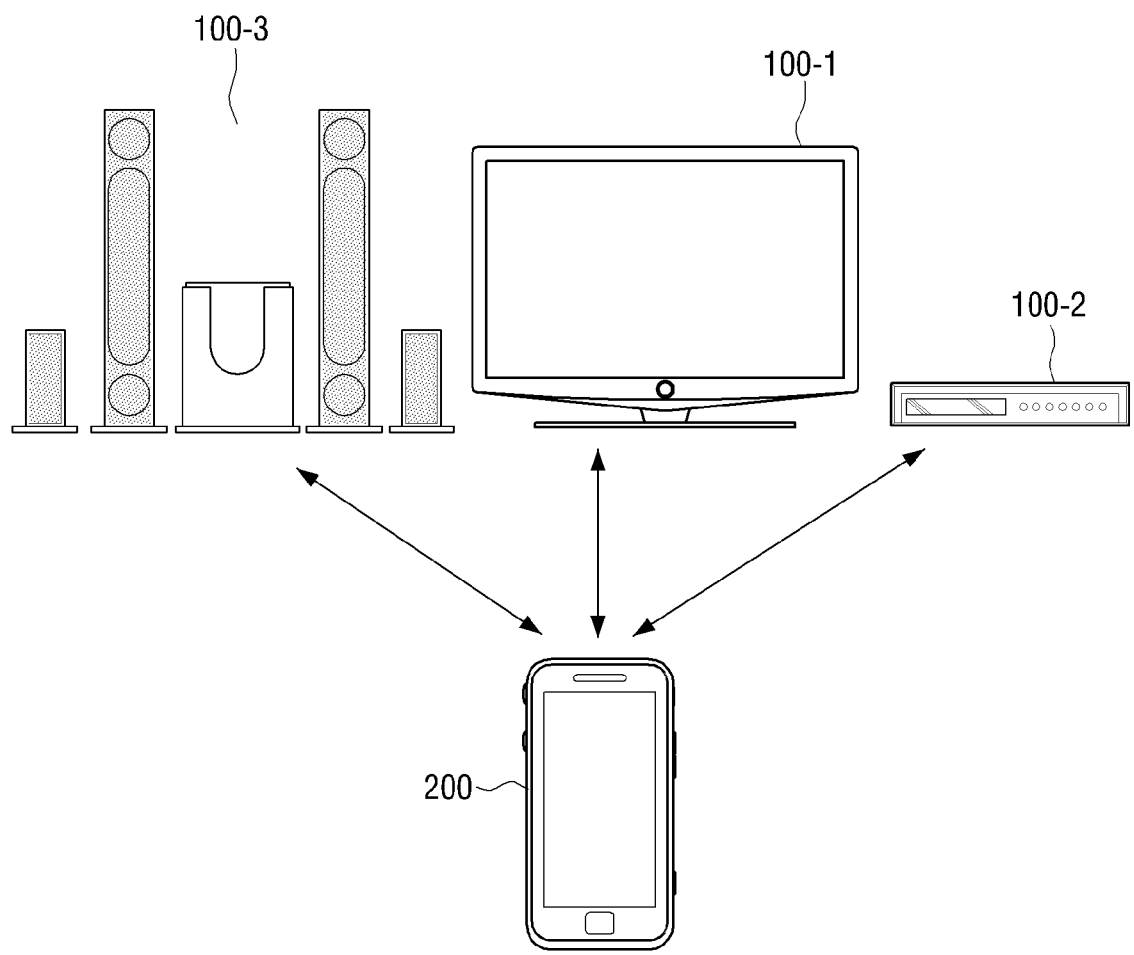
FIG. 2 is a view illustrating an example of a connection of a home network system 1000 according to an exemplary embodiment.

FIG. 2 is a diagram illustrating an example of a home network system 1000 according to an exemplary embodiment.

Referring to FIG. 2, the control device 200 according to FIG. 1 is a remote control and may communicate with a plurality of broadcast receivers in the home network such as a TV 100-1, a BDP (Blue-ray Disk Player, 100-2) and a HTS 100-3 in a unidirectional wireless communication and a bi-directional wireless communication.

Accordingly, if the control device 200 operates in the normal mode, the control device 200 may control the plurality of broadcast receivers by using the bi-directional wireless communication. If the control device 200 operates in the sleep mode and the wake-up mode, the control device 200 may control the broadcast receiver by using the unidirectional wireless communication. For example, if a user wakes up the control device 200 which has entered into a sleep mode, the control device 200 may transmit a control command to the TV 100-1 by using the unidirectional wireless communication when the controlled device was the TV 100-1. In addition, when the controlled device was the BDP 100-2, the control device 200 may transmit a control command to the BDP 100-2 by using the unidirectional wireless communication.

In the description of FIG. 2, the control device 200 controls a broadcast receiver connected to the TV 100-1 in the bi-directional wireless communication and the unidirectional wireless communication mode, but the control device 200 may also control the Blu-ray Disk Player (BDP) 100-2 and the HTS 100-3.

FIG. 2, illustrates three components or broadcast receivers in the home network as an example, but there is no limit to the number of the broadcast receivers which may be connected in the home network. In addition, in the description of an exemplary embodiment, the control device 200 is described as a device controlling only the broadcast receiver 100, but the control device 200 may be used to control any number of devices in the home network capable of communicating in the unidirectional wireless communication and the bi-directional wireless communication.

Figure 3:
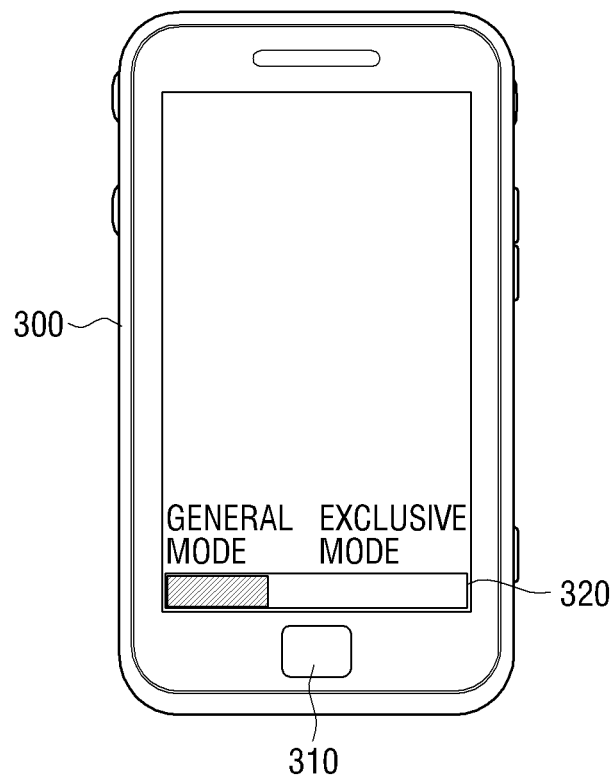
FIGS. 3 to 5 are views illustrating an example of a user interface window which may be displayed on a control device.
Figure 4:
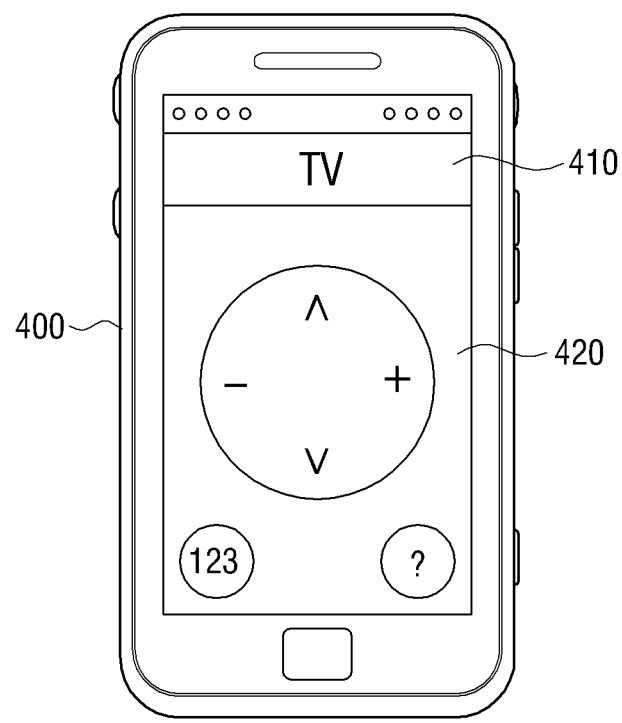
Figure 5:
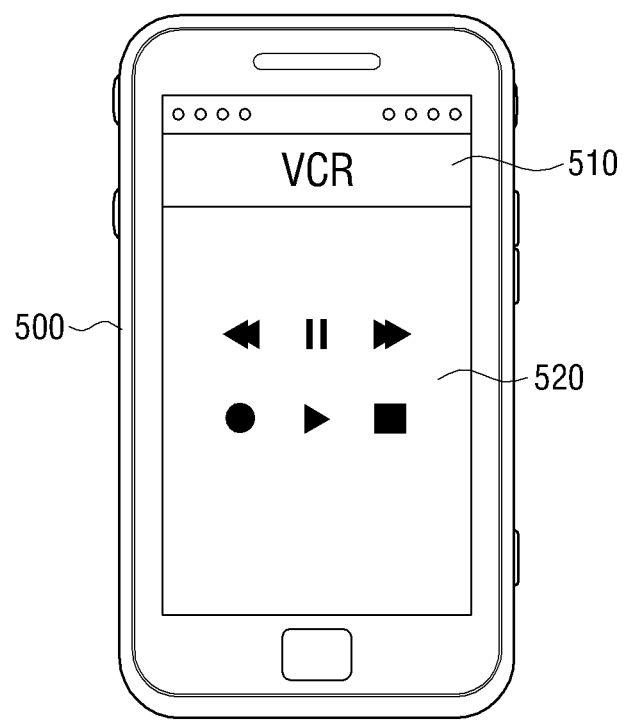

FIGS. 3 to 5 are views illustrating a variety of examples of the user interface windows which may be displayed on the control device 200.

Specifically, FIG. 3 is a view illustrating an example of the user interface window where a user selects a communication mode.

Referring to FIG. 3, the user interface window 300 includes a first region 320 where the user selects a communication mode. Herein, a 'general mode' represents the second communication mode, and an 'exclusive mode' represents the first communication mode. By using a slide bar as illustrated in FIG. 3, the user may convert the communication mode from the second communication mode into the first communication mode.

In FIG. 3, only regions where a user selects the communication mode are illustrated, but regions having a simple remote control shape (for example, a channel up-down and a volume up-down) may be also illustrated.

On the other hand, if the control device 200 e wakes-up and operates in the first communication mode, or the user converts the second communication mode into the first communication mode via the user interface window illustrated in FIG. 3, the user display window as illustrated in FIG. 4 may be displayed.

FIG. 4 and FIG. 5 are views illustrating an example of the user interface window displayed on the user interface unit 130 if the control device 200 operates in the first communication mode.

Referring to FIG. 4, the user interface window 400 includes the first region 410 displaying a TV mode which is a current operation mode and the second region 420 for receiving a control command for the TV from a user.

When the control device 200 controls the VTR device instead of the TV, the user interface window 500 may be displayed as illustrated in FIG. 5.

Referring to FIG. 5, the user interface window 500 includes the first region 510 displaying the VTR which is the current operation mode and the second region 520 for receiving the control command for the VTR from the user.

Figure 6:
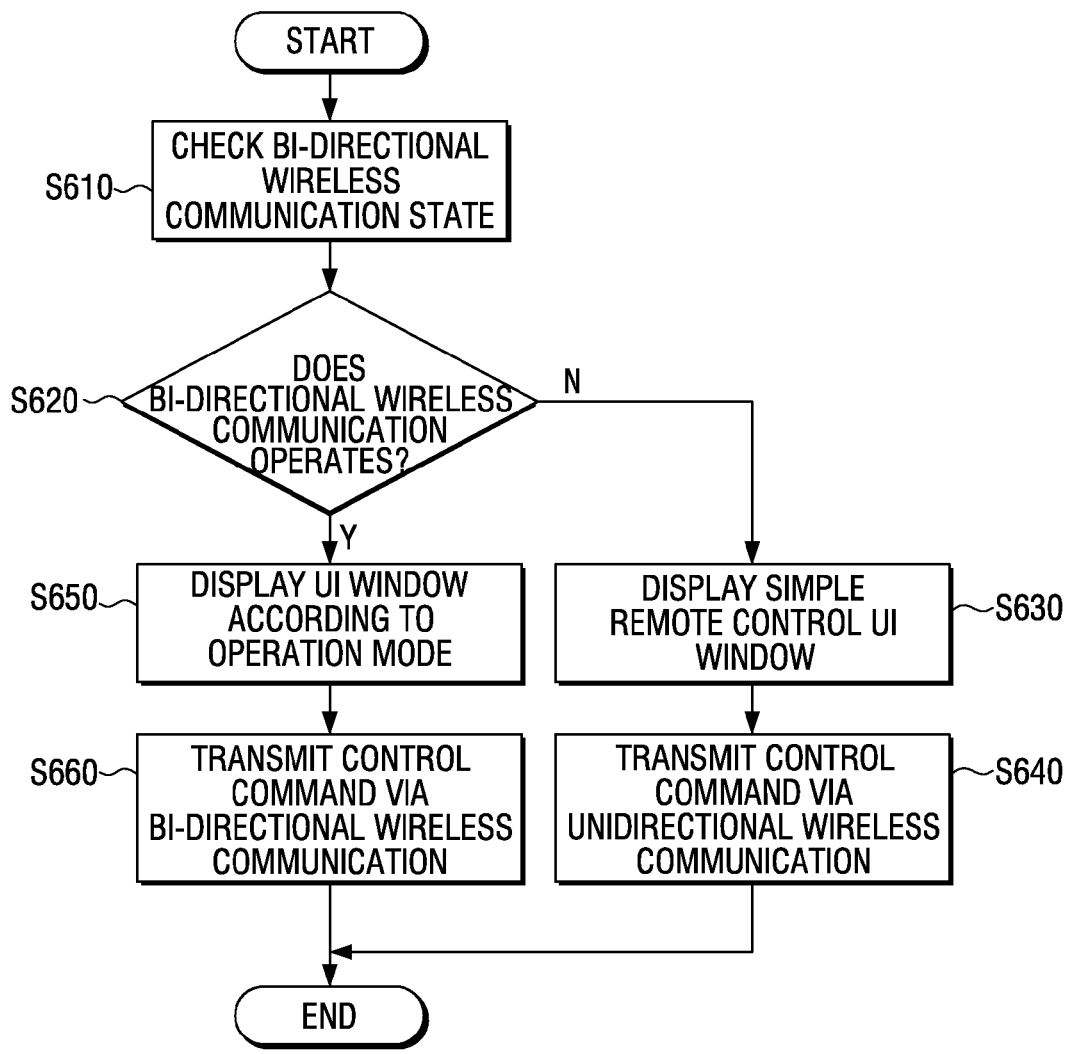
FIG. 6 is a flowchart to explain a method of controlling a broadcast receiver according to an exemplary embodiment.

FIG. 6 is a flowchart describing a control method of the broadcast receiver 100 according to an exemplary embodiment.

First, at operation S610 a communication mode of the control device between the first communication mode using the bi-directional wireless communication and the second communication mode using the unidirectional wireless communication is determined. Specifically, if the control device 200 is in the sleep mode or the wake-up mode, the first communication mode carrying out the bi-directional wireless communication may be determined to be in a non-communication able state. If the control device 200 is in the normal mode, the first communication mode may be determined to be in an operable state. These determinations may be selected by a user.

If the bi-directional wireless communication is determined to be in a non-operable state S620-N, the second user interface window corresponding to the second communication mode is displayed S630, and a control command is received via the displayed user interface window, and then the received control command is transmitted S640 via the unidirectional wireless communication.

If the bi-directional wireless communication is determined to be in an operable state S620-Y, the user interface window corresponding to the current operation mode is displayed S650, and the control command is received via the displayed user interface window and then the received control command is transmitted via the bi-directional wireless communication S660.

Therefore, the method of controlling the broadcast receiver according to an exemplary embodiment may control the broadcast receiver by using the unidirectional wireless communication even when bi-directional wireless communication is impossible, thereby enhancing a user convenience. The method of controlling the broadcast receiver as illustrated in FIG. 6 may be carried out on the control device having a configuration of FIG. 1 as well as on the broadcast receiver having other configurations.

The foregoing exemplary embodiments and advantages are merely exemplary and are not to be construed as limiting the exemplary embodiments. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A control device which controls a display apparatus, comprising:
   a first communication interface unit which transmits a control command to the display apparatus in a first communication mode which uses a bi-directional wireless communication;
   a second communication interface unit which transmits the control command to the display apparatus in a second communication mode which uses a unidirectional wireless communication;
   a state determination unit which determines a communication mode of the control device between the first communication mode and the second communication mode;
   a user interface unit which displays a different selected user interface window from among a plurality of user interface windows based on the determined communication mode of the control device and receives a control command for the display apparatus; and
   a control unit which transmits the received control command according to the determined communication mode.

2. The device as claimed in claim 1, wherein the state determination unit determines the communication mode of the control device to be the second communication mode if determined that the control device cannot communicate via the first communication mode, and determines the communication mode of the control device to be the first communication mode if determined that the control device can communicate via the first communication mode.

3. The device as claimed in claim 2, wherein the state determination unit determines that the control device is not in the first communication mode is if the control device is in a sleep mode or a wake-up mode.

4. The device as claimed in claim 1, wherein the user interface unit allows a user to select the first communication mode or the second communication mode; and
   wherein the state determination unit determines the selected communication mode to be the communication mode of the control device.

5. The device as claimed in claim 1, further comprising:
   a storing unit which stores at least one user interface window between a first user interface window which corresponds to the first communication mode and a second user interface window which corresponds to the second communication mode, wherein the second user interface window comprises a selection region which receives a first communication mode conversion command.

6. The device as claimed in claim 5, wherein the user interface unit indicates that the control device operates in the first communication mode, if the first communication mode is in a communication able state while the second user interface window is being displayed.

7. The device as claimed in claim 1, wherein the user interface unit displays a same user interface window as before entering into a sleep mode or off mode by the control device, if the determined control mode is the first communication mode.

8. The device as claimed in claim 1, wherein the second communication interface unit is a low-power communication interface unit which operates at a lower power than the first communication interface unit.

9. The device as claimed in claim 1, wherein the first communication mode becomes a non-communication able state if the control device enters into a sleep mode.

10. The device as claimed in claim 1, wherein the bi-directional wireless communication is at least one among a Wi-Fi, radio-frequency (RF), Bluetooth, and Wireless high-definition multimedia interface-consumer electronic control (HDMI-CEC), and wherein the unidirectional wireless communication is an infrared data association.

11. A method of controlling a display apparatus in a control device, comprising:

determining a communication mode of the control device between a first communication mode which uses a bi-directional wireless communication and a second communication mode which uses a unidirectional wireless communication;

selecting a different user interface window from among a plurality of user interface windows based on the determined communication mode;

displaying the user interface window;

receiving an input control command for the display apparatus via the displayed user interface window; and transmitting the input control command to the display apparatus according to the determined communication mode.

12. The method as claimed in claim 11, wherein the determining the communication mode comprises determining the communication mode of the control device to be the second communication mode if the control device cannot communicate via the first communication mode, and determining the communication mode of the control device to be the first communication mode if the control device can communicate via the first communication mode.

13. The method as claimed in claim 12, wherein the determining the communication mode determines that the control device is not in the first communication mode if the control device is in a sleep mode or a wake-up mode.

14. The method as claimed in claim 11, wherein the determining the communication mode is determined by a user selecting the communication mode of the control device.

15. The method as claimed in claim 11, wherein the displaying the user interface window displays at least one pre-stored user interface window between a first user interface window which corresponds to the first communication mode and a second user interface window which corresponds to the second communication mode, and comprises a selection area to receive the first mode conversion command.

16. The method as claimed in claim 15, further comprising:

indicating that the control device can operate in the first communication mode if the first communication mode is in a communication able state while the second user interface window is displayed.

17. The method as claimed in claim 11, wherein displaying the user interface window displays a same user interface window as before the control device entered into one mode between a sleep mode and an off mode, if the determined control mode is the first communication mode.

18. The method as claimed in claim 11, wherein the second communication mode uses a communication interface which operates at a lower power than the first communication mode.

19. The method as claimed in claim 11, further comprising:

the first communication mode becoming a non-communication able state if the control device enters into a sleep mode.

20. The method as claimed in claim 11, wherein the bi-directional wireless communication is at least one among radio-frequency (RF), Bluetooth, and Wireless high-definition multimedia interface-consumer electronic control (HDMI-CEC), and wherein the unidirectional wireless communication is Infrared Data Association.

* * * * *